(12) United States Patent
Xi et al.

(10) Patent No.: US 9,605,759 B2
(45) Date of Patent: Mar. 28, 2017

(54) METAL SEAL FOR ULTRA HIGH VACUUM SYSTEM

(71) Applicant: Hermes Microvision, Inc., Hsinchu (TW)

(72) Inventors: Qingpo Xi, Beijing (CN); Tao Li, Beijing (CN); Feng Cao, Beijing, CA (US); Fumin He, Beijing, CA (US); Zhongwei Chen, San Jose, CA (US)

(73) Assignee: HERMES MICROVISION INC., Hsinchu (TW)

( * ) Notice: Subject to any disclaimer, the term of this patent is extended or adjusted under 35 U.S.C. 154(b) by 0 days.

(21) Appl. No.: 14/567,075

(22) Filed: Dec. 11, 2014

(65) Prior Publication Data

US 2015/0091258 A1    Apr. 2, 2015

Related U.S. Application Data

(62) Division of application No. 13/437,107, filed on Apr. 2, 2012.

(51) Int. Cl.
*F16L 23/20* (2006.01)
*F16J 15/08* (2006.01)

(52) U.S. Cl.
CPC .......... *F16J 15/0881* (2013.01); *F16L 23/20* (2013.01)

(58) Field of Classification Search
CPC ........ F16L 23/20; F16L 23/18; F16J 15/0881; F16J 15/06; F16J 15/08
USPC ................... 277/626, 615, 609, 608, 602
See application file for complete search history.

(56) References Cited

U.S. PATENT DOCUMENTS

| | | | |
|---|---|---|---|
| 1,821,864 A | | 9/1931 | Wilson |
| 1,821,865 A | | 9/1931 | Wilson |
| 3,078,110 A | | 2/1963 | Starr |
| 4,372,565 A | * | 2/1983 | Lien ............................. 277/614 |
| 4,550,921 A | * | 11/1985 | Smith ........................... 277/614 |
| 4,563,025 A | * | 1/1986 | Poe ............................ 285/334.2 |
| 5,528,972 A | | 6/1996 | Wilson et al. |

FOREIGN PATENT DOCUMENTS

| | | | |
|---|---|---|---|
| EP | 682202 A1 | * | 5/1994 |
| FR | 2874074 | * | 8/2005 |

* cited by examiner

*Primary Examiner* — David E Sosnowski
*Assistant Examiner* — James A Linford
(74) *Attorney, Agent, or Firm* — WPAT, PC; Justin King; Douglas Hosack

(57) ABSTRACT

A metal gasket has a cross-sectional shape that is a six sided shape that resembles an irregular quadrangle that is substantially isosceles trapezoidal in shape with two sharp angles between the longest side and the second- and third-longest sides, respectively. The longest side of the cross section is the inner wall of the metal gasket.

1 Claim, 11 Drawing Sheets

| number | Gasket cross section | Gap between flanges after tighten | Bolt down resistance |
|---|---|---|---|
| 1 | Trapezoid | Almost none | smallest |
| 2 | Hexagon | 0.15~0.2mm | largest |
| 3 | Knife edge flange | 0.15mm | median |

Figure 6

| Test No. | Reduction in height (mm) | Leak test | After baking | Required tighten force |
|---|---|---|---|---|
| 1 | 0.1 | Continue outgas | Continue outgas | Minor |
| 2 | 0.2 | Continue outgas | Continue outgas | Slight |
| 3 | 0.3 | Continue outgas | No leaking | Small |
| 4 | 0.4 | No leaking | No leaking | Median |
| 5 | 0.5 | No leaking | No leaking | Largest |

Figure 7

METAL SEAL FOR ULTRA HIGH VACUUM SYSTEM

CROSS-REFERENCES TO RELATED APPLICATIONS

This application is a division of the U.S. application Ser. No. 13/437,107, filed 2012 Apr. 2; the entire disclosures of which are incorporated herein by reference.

FIELD OF THE INVENTION

The present invention relates to a metal gasket, a vacuum flange for the metal gasket, and a vacuum seal flange assembly utilized in a vacuum seal at connections for an ultra high vacuum (UHV) system.

BACKGROUND OF THE INVENTION

In assembling ultra high vacuum (UHV) systems operating at pressures below approximately 10-6 torr, seals and closures have presented challenging problems. For such systems, rubbers and elastomers are not suitable as seals as they are permeable to gases to an extent such that very low base pressures cannot be attained and such seals typically cannot survive the high temperatures often necessary to bake out vacuum systems. When frequent separation or proximity of heat sensitive materials makes welding impractical, plastically deformed metal seals are satisfactory. The seals, however, require very rigid flanges and many closely spaced bolts to accomplish a sufficiently tight seal, and assembly and disassembly are time consuming. Nevertheless, plastically deformed metal seals such as gold wire and flat copper washers are the most reliable seals and are used almost universally in UHV work. Many styles have been developed, from laboratory fabricated special seals to commercially available standardized seals.

Some typical seals are illustrated in FIG. 1a to FIG. 1e. FIG. 1a shows a crushed wire ring gasket configuration, with a gasket 20, an upper flange 30, a lower flange 10 and a dead space 1. Crushed wire rings can be made of gold, copper, or aluminum. These gaskets are generally made from round wire with a desired diameter cut to the length of the gasket's mean circumference, then formed into a circle and welded. They provide positive pressures. Since they only begin with a line of contact, they have a high local seating stress at low bolt loads. The contact faces increase in flowing into flange faces.

FIG. 1b shows a crushed step seal with flat gasket configuration, with a gasket 20, an upper flange 30, a lower flange 10 and a dead space 1, wherein the soft metal gasket 20 is crushed and deformed in a groove of the two flat flange members by a bolt down force.

FIG. 1c shows a coined gasket seal, with a gasket 20, an upper flange 30, a lower flange 10 and a dead space 1 wherein a rectangular shaped gasket crushed in a groove by bolt down force.

FIG. 1d shows a knife edge seal with a gasket 20, an upper flange 30, a lower flange 10 and a dead space 1, wherein the two flanges with V-shaped ridges facing each other and a soft metal gasket in between, held together by a clamp or bolt. The V-shaped ridge is filled in with the material as the gasket is deformed.

FIGS. 1e and 1f show a Conflat® brand metallic vacuum sealing flange seal by Varian Associates with a gasket 20, an upper flange 30, a lower flange 10 and a dead space 1, wherein a soft metal gasket captured in a rigid structure which deforms the gasket. Long bake out times at high temperatures relieve internal stresses and the force on the seal, allowing the joint to be leak-tight as differential thermal expansion is limited.

Cryofit® brand heat-shrinkable hydraulic couplings by Raychem Corporation utilize Nitinol, a shape-memory alloy. The Cryofit® connector is essentially a sleeve of Nitinol, having internal seal ridges in series, which is bored in the austenitic phase to a diameter less then the outside diameter of pipes to be joined, then chilled and transformed to martensite, and mechanically expanded to a diameter greater than the outside diameter of pipes to be joined. The connector can be slipped over the pipes, heated and transformed to austenite, whereby a hoop stress presses the series of seal ridges into the outside surface of the pipes making an excellent pipe and hydraulic connection.

Helicoflex® brand metal gaskets by Carbone-Lorraine Industries Corporation utilize a shape-memory alloy to seal cavities, as disclosed in U.S. Pat. No. 4,445,694.

All these sealing forces, external normal force bolt down or internal pressure, are applied to deform the metal gasket. The deformed metal gasket blocks the channels that connect the confined chamber and outside environment. Thereafter the chamber can be pumped down to the desired ultrahigh vacuum (UHV) with proper equipment.

Obara et al. in U.S. Pat. No. 4,988,130 discloses a formula to estimate how many bolts are needed to affix a pair of flanges of thickness t using a copper gasket as a seal for a pipe end of a plasma vacuum vessel. These flanges each have a ring-shaped knife edge. However, Obara's suggestion is for a large round-shaped pipe end with M8 bolts, and is not suitable for a smaller size vessel with multiple openings to be sealed with thinner M5 bolts and limited space to affix the bolts.

The present invention provides a metal gasket that is easily deformed with fewer bolts within a limited working space, yet still provides the same ability to reach a desired ultrahigh vacuum (UHV) level.

SUMMARY OF THE INVENTION

The present invention provides a new metal gasket design that provides a seal for an ultra high vacuum system. The metal gasket provides a similar or better sealing effect with less tightening force and withstands long baking times at high temperature within a limited working space as compared to a conventional gasket.

The shape of the metal gasket may be round, square, or any shape. However, the cross section of the metal gasket is a six sided shape that resembles an irregular quadrangle that is substantially isosceles trapezoidal in shape with two sharp angles to reduce the applied bolt down force. The longest side of the cross section is the inner wall of the metal gasket. A preferred cross sectional shape of the metal gasket has an outer side parallel to the inner wall, and has an outer side-to-inner wall length ratio of about 1:10. A preferred thickness of the cross section is about one half of the length of the inner wall. A preferred sharp angle between the inner wall and an angled, second-longest side of the cross section is between 30 and 60 degrees.

One embodiment of the invention is a metal seal flange assembly for a vacuum system, comprising two metallic objects having a pair of opposite surfaces facing each other, at least one of the metallic objects having an opening that leads to a confined chamber, wherein a normal force is applied to the two opposite surface and form a system for vacuum, there is a matching groove on the second object; a metal gasket is interposed in the groove between the two metallic objects; and the cross section of the metal gasket is a six sided shape that resembles an irregular quadrangle that is substantially isosceles trapezoidal in shape with two sharp angles between the longest side and next two longest, angled sides, respectively. The longest side of the cross section is the inner wall of the metal gasket. A preferred cross sectional shape of the metal gasket is a six sided shape that resembles an irregular quadrangle that is substantially isosceles trapezoidal in shape with an opposite side parallel to the longest side with a length ratio of about 1:10 as compared to the longest side. A preferred thickness of the cross section perpendicular to the longest side is about one half of the length of the longest side. A preferred sharp angle between the longest side and an angled, next longest side is between 30 and 60 degrees. The normal force applied to the two opposite surfaces is provided by a number of bolts. A gas pass is cut on the second flange to expose the dead space to vacuum.

The metal seal flange assembly has the following distinguishing features: 1. the seal plane of the upper flange is flat, the lower flange has a groove to interpose the metal gasket; 2. a cross section of the metal gasket is a six sided shape that resembles an irregular quadrangle that is substantially isosceles trapezoidal in shape with two sharp angles between the longest side and the two angled, next longest sides of the cross section, respectively; 3. the gasket deforms inward while normal force is applied; 4. the gasket can sustain a baking temperature over 150 C without gas leakage; 5. the metal seal flange assembly provides similar or better seal outcome with a smaller tightening force and less number of bolts in a limited working space; 6. a gas path is introduced to expose the dead space to vacuum and thereafter reduce any outgas issue; 7. the metal seal flange assembly uses a thinner metal gasket to achieve a desired vacuum level; and 8. the metal seal flange assembly is easy to manufacture.

BRIEF DESCRIPTION OF THE DRAWINGS

The present invention will be readily understood by the following detailed description in conjunction with the accompanying drawings, wherein like reference numerals designate like structural elements, and in which:

FIG. 1a is a crush metal ring; FIG. 1b is a step seal; FIG. 1c is a coined gasket seal; FIG. 1d is knife edge seal; FIG. 1e is a Conflat® brand metallic vacuum sealing flange seal before bolt tightening. FIG. 1f is a Conflat® brand metallic vacuum sealing flange seal after bolt tightening.

FIG. 6 is a table that compares tightening force between three different metal gaskets according one embodiment of present invention.

FIG. 7 is a table that compares different deformation amount of the metal gasket and leak test outcome according one embodiment of present invention.

DETAILED DESCRIPTION OF THE INVENTION

Reference will now be made in detail to specific embodiments of the invention. Examples of these embodiments are illustrated in accompanying drawings. While the invention will be described in conjunction with these specific embodiments, it will be understood that it is not intended to limit the invention to these embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations are not described in detail in order not to unnecessarily obscure the present invention.

As previously discussed, the metal gasket deforms during bolt down and blocks the connecting channels to the environment outside the confined chamber, thereafter enabling the ultrahigh vacuum within the chamber with proper pump down equipment. A conventional metal gasket is an annular or rectangular shaped soft metal with a round or rectangular shaped cross section. Many metals are used for gasketing purposes. Some of the most common range from soft varieties such as lead, copper, steel, nickel, stainless, and Inconel to the high alloyed steels. Precious metals such as platinum, silver, and gold are also used to a limit extent. In the present disclosure, we will use oxygen free copper as an example to explain and clarify issues we meet.

Figure 1A:
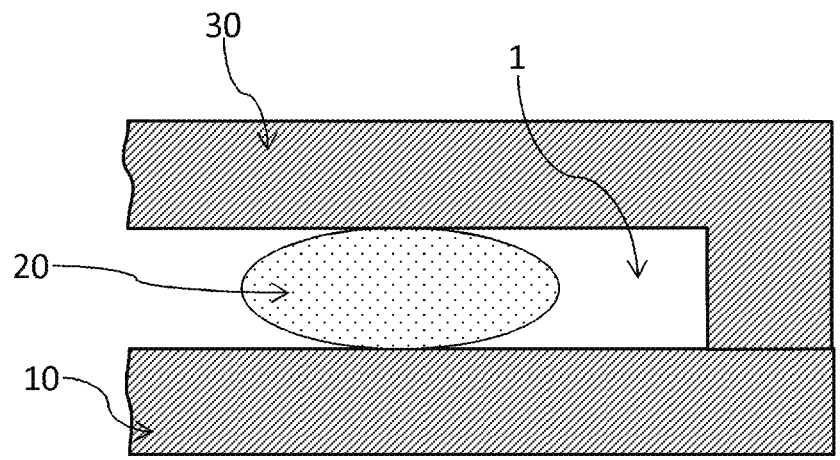
FIGS. 1a-f are schematic diagrammatic representations of prior art metal seal methods.
Figure 1B:
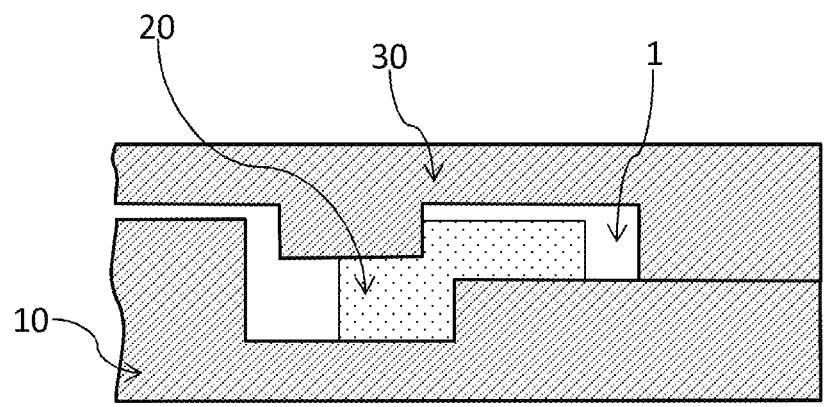
Figure 1C:
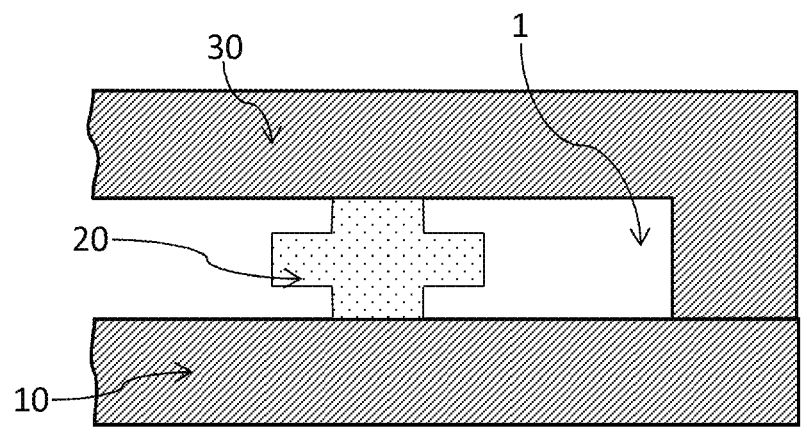
Figure 1D:
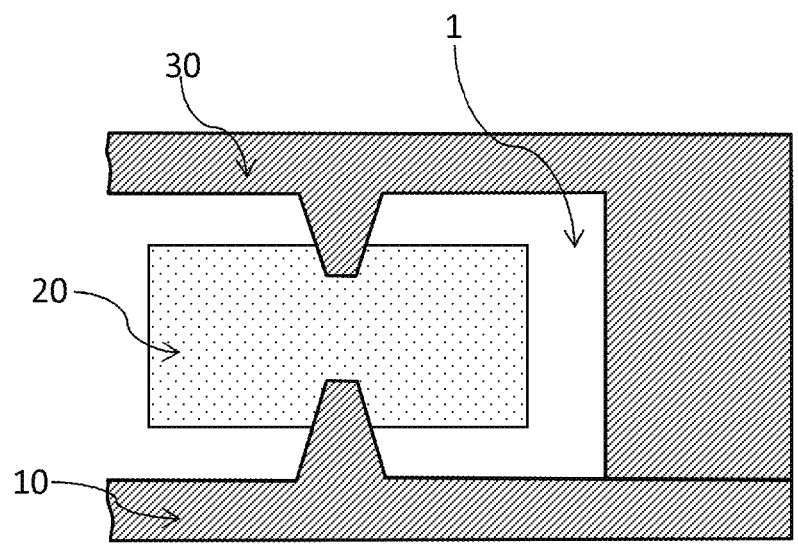
Figure 1E:
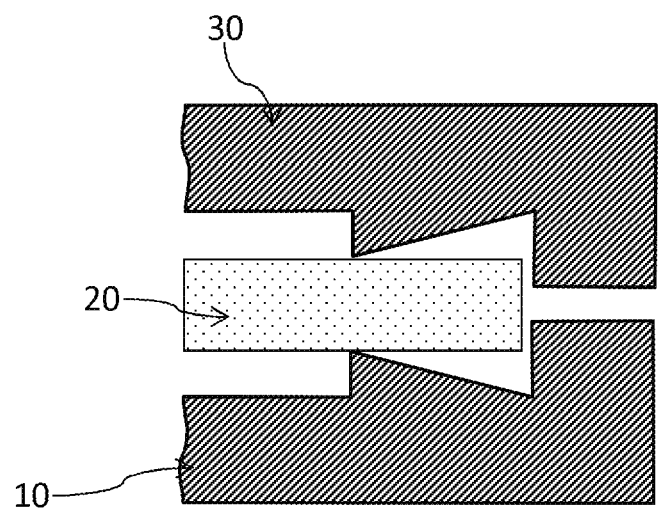
Figure 1F:
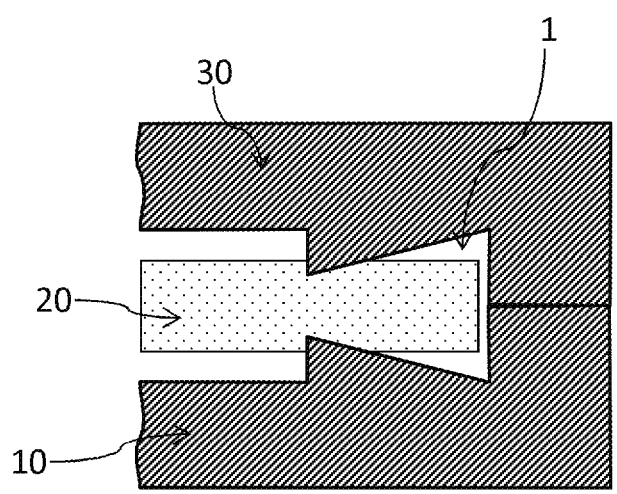
Figure 2:
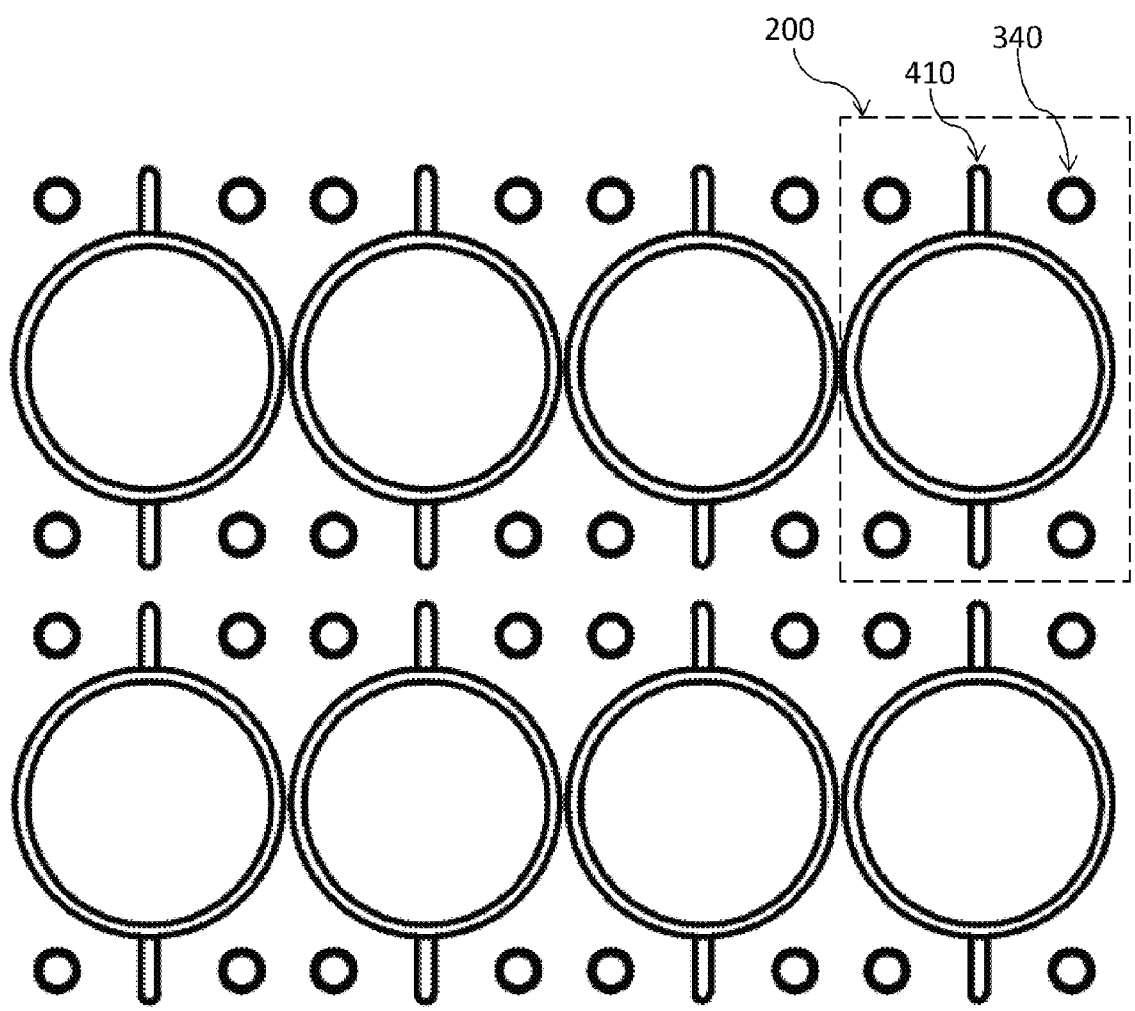
FIG. 2 indicates the position of multiple holes to be sealed in chamber surface.

The ultimate yield stress of copper is about 200 Mpa which is equivalent to 200 N/mm. To deform a copper gasket with a conventional round shape cross section; the ultimate yield stress must be reached. According to the formula provided in U.S. Pat. No. 4,988,130, the sealing load to deform the copper gasket requires at least eight M8 bolts. In the present invention, as FIG. 2 illustrates, the space left for sealing multiple holes 340 on the chamber surface 200 is limited. It is impossible to put eight bolts around each hole. In addition to reducing the number of bolts required, the present invention also enables the use of thinner metal gaskets to reduce the total weight of the chamber.

Figure 3A:
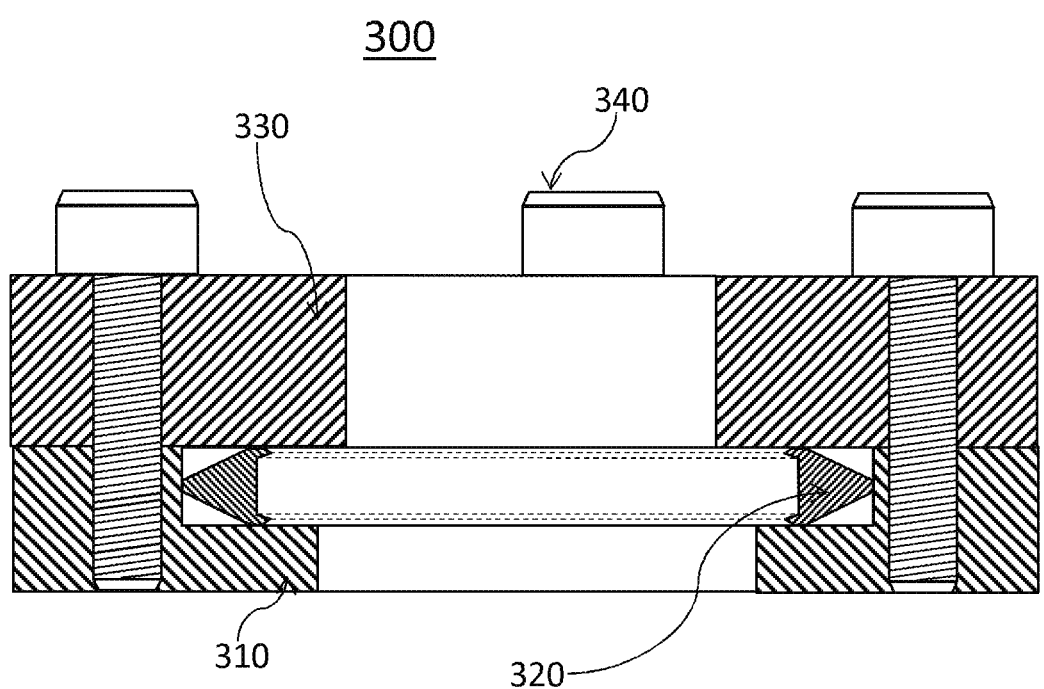
FIG. 3a is a schematic diagrammatic representation of a metal seal flange assembly with the metal gasket of the present invention.
Figure 3B:
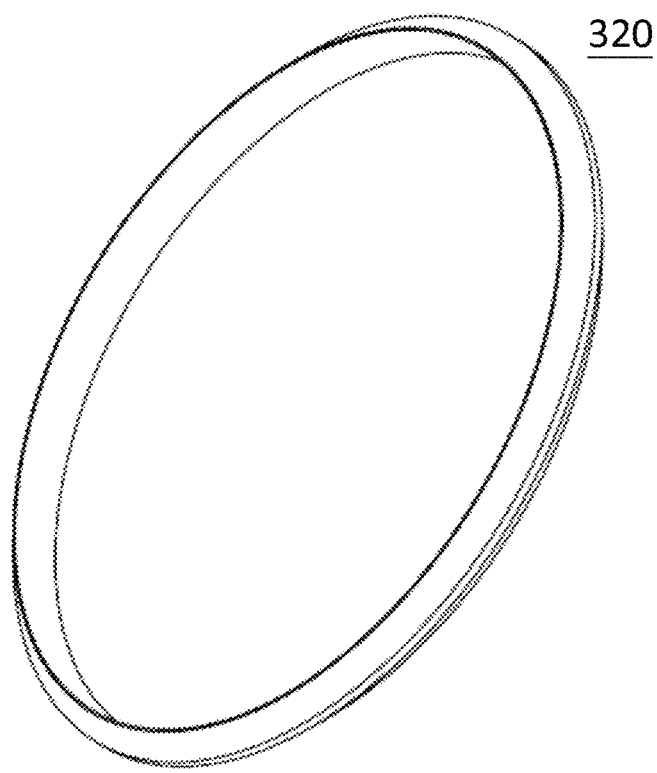
FIG. 3b is a perspective view of the metal gasket design of the present invention.

The purpose of present invention is to provide a metal seal for an ultra high vacuum system, for example a multi-axis e-beam column, with less bolt-down force in a limited working space. In an embodiment of the invention, unlike a conventional structure, the upper (the first) flange and the lower (the second) flange of the assembly are not symmetrical. FIG. 3a illustrates the metal seal flange assembly 300 of the present invention, comprising a lower flange 310, an upper flange 330, a metal gasket 320, an upper flange 330, and bolts 340. FIG. 3b illustrates the metal gasket 320 for the metal seal flange assembly. As seen in FIG. 3a, the metal gasket 320 sits on a groove on the lower flange 310 and the seal plane of upper flange 330 is flat.

Figure 3C:
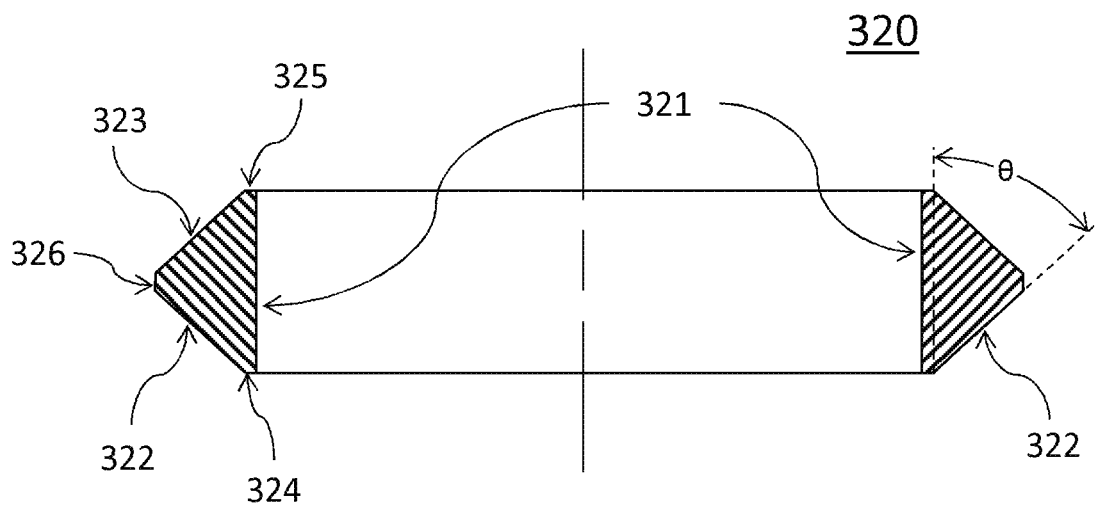
FIG. 3c is a cross sectional view of the metal gasket according one embodiment of present invention.
Figure 3D:
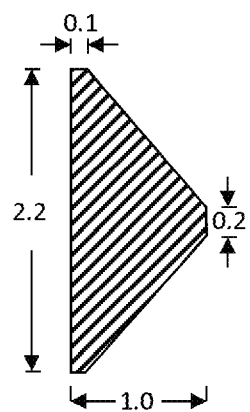
FIG. 3d is detail of preferred proportions of the cross sectional shape of the metal gasket according an embodiment of present invention.

One embodiment of the present invention specifies the shape of the cross section of the metal gasket 320 as a six sided shape that resembles an irregular quadrangle that is substantially isosceles trapezoidal in shape, as FIG. 3c illustrates. The cross section comprises a longest side 321, a first angled side 322, a second angled side 323, an lower side 324, an upper side 325, and an opposite side 326. The longest side 321 of the cross section is the vertical inner wall of the metal gasket 320. As seen in FIGS. 3c and 3d, the preferred cross section has, for example, the ratio between the length of the opposite side 326 to the length of the longest side 321 is about 1:10; the width of the cross section perpendicular to the longest side 321 is about half of the length of the longest side 321; and angle θ between the first angled side 322 and the longest side 321 is between 30 and 60 degrees. This design narrows the contact plane of the upper flange 330 and the metal gasket 320, which enables higher normal stress per unit area with a given bolt down force. Thereafter the ultimate yield stress of the metal gasket 320, for example oxygen free copper gasket, can be reached with fewer bolts and thinner bolts than suggested by U.S. Pat. No. 4,988,130.

Figure 4A:
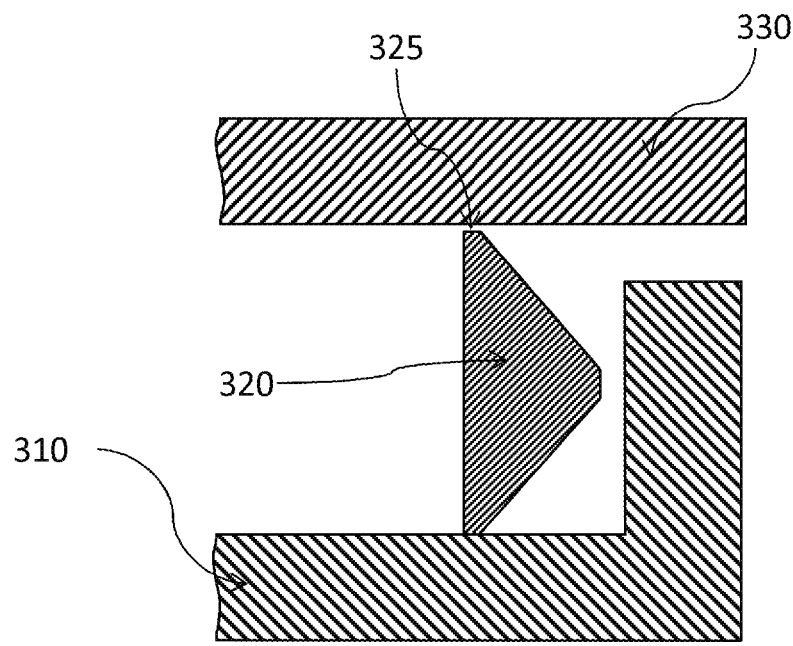
FIG. 4a is a cross section view of the flanges and metal gasket before a bolt-down force applied according one embodiment of present invention.
Figure 4B:
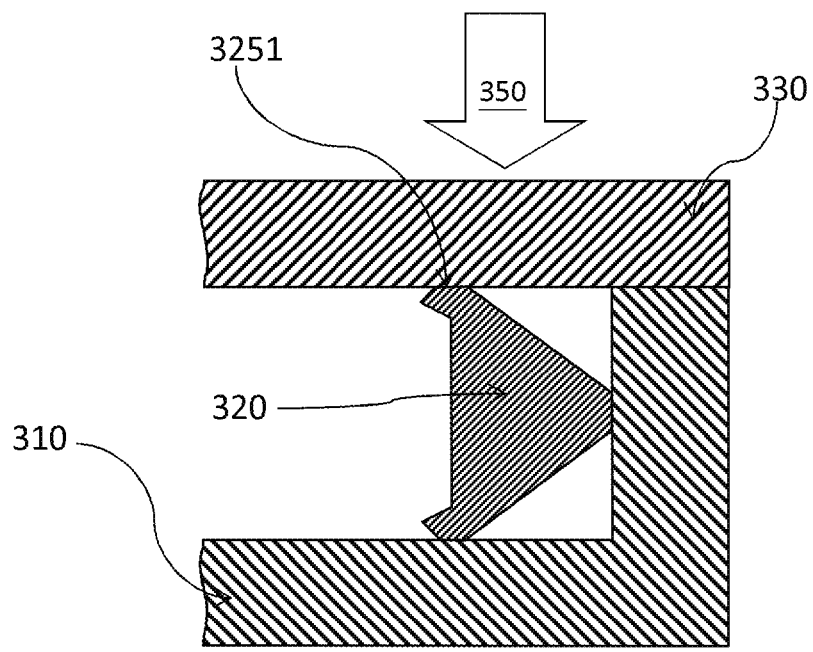
FIG. 4b is a cross section view of the flanges and metal gasket after a bolt-down force applied according one embodiment of present invention.

FIGS. 4a and 4b show the deformation process. FIG. 4a shows the cross-sectional form of metal gasket 320 as discussed above prior to the application of sealing force 350. Upon application of sealing force 350 as shown in FIG. 4b, metal gasket 320 is deformed to have a deformed upper side 3251 with a length greater than upper side 325.

Figure 5A:
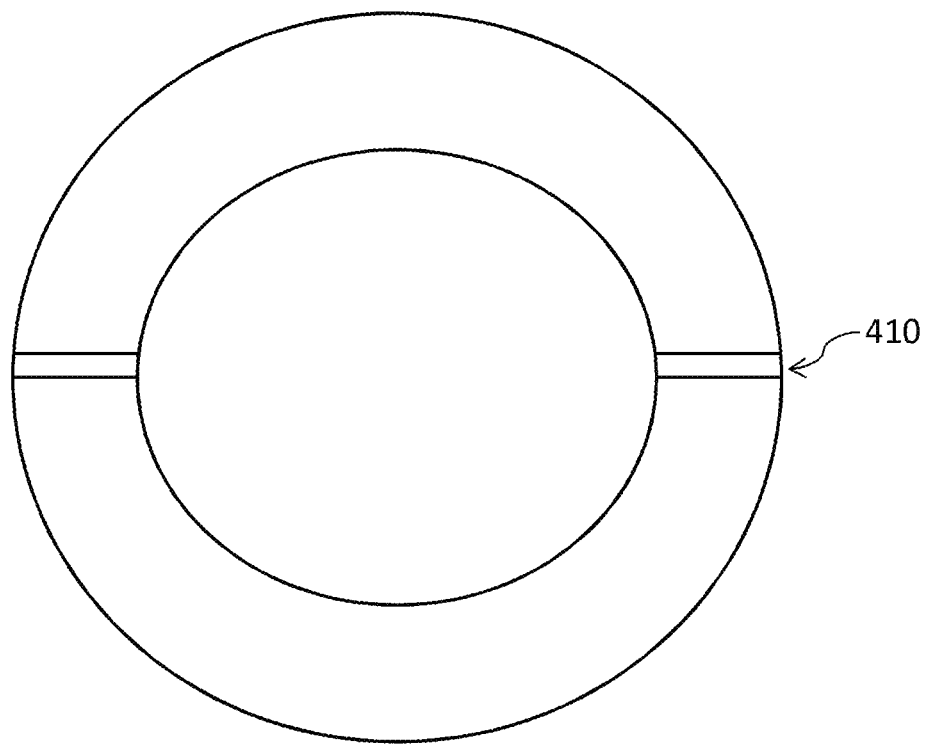
FIG. 5a is a top view of the gas path on the seal structure that exposes the dead space to vacuum environment.
Figure 5B:
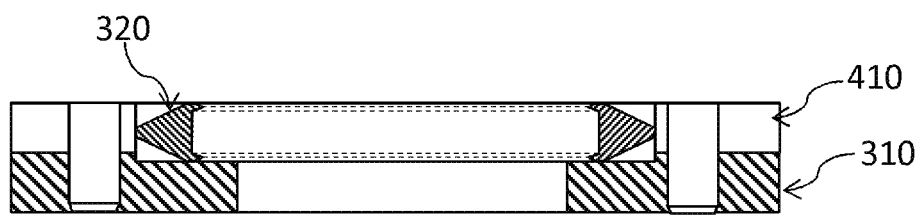
FIG. 5b is a cross section of the lower flange and gasket showing the gas path on the seal structure that exposes the dead space to vacuum environment.
Figure 5C:
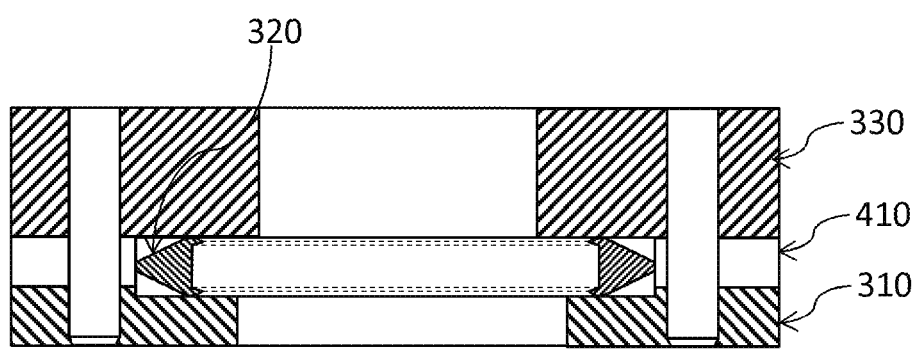
FIG. 5c is a cross section of the combined lower and upper flanges showing the gas path on the seal structure that exposes the dead space to vacuum environment.

The metal gasket sits in the groove and deforms when the upper and lower flanges are bolted together. The deformed metal gasket blocks the channels that connect the confined chamber to the outside environment. At the same time, the deformed metal gasket leaves a dead space between the two flanges in the groove. During the pump down process to produce ultrahigh vacuum, the dead space will continue to outgas and retard the time to reach a desired vacuum level. Sometimes, the desired vacuum level is not easy to reach if the dead space is too big. The embodiment of the present invention shown in FIGS. 5a-5c introduces a gas path 410 on the lower flange 310 to expose the dead space formed by metal gasket 320, lower flange 310, and upper flange 330 after the deformation process shown in FIG. 4. This design can eliminate the dead space outgassing issue during pump down process and lessen the time to reach the desired vacuum level.

The leak test of a metal seal flange assembly with different deformation amounts applied to the gasket is illustrated in FIG. 7. The leak test was performed with helium leak detection equipment. The best result is reached when 0.4 mm deformation, which is about 20% total reduction in height of the metal gasket, was applied to the assembly. At this condition, the metal gasket requires a medium sealing force to tighten the assembly and the assembly passed the leak test before and after baking at 150 degrees celsius, for 7 hours. The metal seal flange assembly with the metal gasket can reach a vacuum pump down to 7.6E-10 torr.

A metal seal flange assembly 300 for ultra high vacuum system comprise of two flanges and a metal gasket. Position the metal gasket 320 between the flange 310 and flange 330, as the FIG. 3a illustrates. The shape of metal gasket may be round, squared or in any other shape. However, the cross section of the metal gasket 320 is a six sided shape that resembles an irregular quadrangle that is substantially isosceles trapezoidal in shape. The longest side of the irregular is the vertical inner wall of the metal gasket. A preferred thickness of the cross section perpendicular to the longest side is about one half of the length of the longest side. The metal gasket 320 contacts the two flanges with the sharp angle by the longest side. Provide normal force with bolts 340 to tighten the metal seal flange assembly. During the tightening process, the metal gasket 320 is deformed and provides a seal to the metal seal flange assembly with lower flange 310 and upper flange 330. A gas path 410 is cut on the lower flange 310 to expose the dead space produced between the metal gasket 320 and lower flange 310 to a vacuum environment which thereafter resolves the outgas issue during vacuum pump down.

The metal seal flange assembly 300 has the following distinguishing features: 1. The two flanges are not symmetric, one seal plane of flange is flat, the other flange has a shallow groove to set the metal gasket; 2. cross section of the metal gasket is a six sided shape that resembles an irregular quadrangle that is substantially isosceles trapezoidal in shape with two sharp angles between the longest side and the first and second angled sides, respectively; 3. the metal gasket deforms inward during bolt-down; 4. the metal gasket can sustain a baking temperature over 150 C without gas leakage; 5. the seal structure can provide similar or better seal outcome with smaller tightening force and fewer bolts in a confined working space; 6. a gas path is introduced to expose the dead space to vacuum and thereafter reduce the outgas issue; 7. the metal seal flange assembly uses a thinner metal gasket to achieve the desired vacuum level; and 8. the seal structure is easy to manufacture.

What is claimed is:

1. A metal gasket used for a vacuum seal, comprising:
   an annular gasket made of metal with a cross section having six sides, consisting of:
   an inner side, corresponding to an inner wall of the metal gasket;
   a top side, extending from said inner side and being substantially perpendicular with the inner side;
   a bottom side, extending from said inner side and being substantially perpendicular with the inner side;
   an outer side, corresponding to an outer wall of the metal gasket and being parallel with the inner side;
   an upper angled side, connecting said top side to said outer side; and
   a lower angled side, connecting said bottom side to said outer side;
   wherein the cross section has an acute angle between said longest side and said lower angled side between 30 degrees and 60 degrees, a thickness of said cross section from said inner side to said outer side is at least ten times the length of said top side, said thickness is five times the length of said outer side, and the length of said inner side is 2.2 times said thickness,
   wherein when the metal gasket is used in sealing, at least one of the top side or bottom side deforms in a manner where a projection is formed which extends beyond said inner side away from said outer side.

* * * * *